(12) United States Patent
McNulty

(10) Patent No.: US 11,335,488 B1
(45) Date of Patent: May 17, 2022

(54) MAGNETIC ENERGY SYSTEM

(71) Applicant: Mark S. McNulty, Cheyenne, WY (US)

(72) Inventor: Mark S. McNulty, Cheyenne, WY (US)

( * ) Notice: Subject to any disclaimer, the term of this patent is extended or adjusted under 35 U.S.C. 154(b) by 0 days.

(21) Appl. No.: 17/385,713

(22) Filed: Jul. 26, 2021

(51) Int. Cl.
*H01F 7/02* (2006.01)
*B65G 21/20* (2006.01)
*B65G 54/02* (2006.01)

(52) U.S. Cl.
CPC ........... *H01F 7/02* (2013.01); *B65G 21/2018* (2013.01); *B65G 54/02* (2013.01)

(58) Field of Classification Search
CPC ..... H01F 7/02; H01F 7/0231; B65G 21/2018; B65G 54/02
See application file for complete search history.

(56) References Cited

U.S. PATENT DOCUMENTS

| | | | | |
|---|---|---|---|---|
| 4,062,443 A * | 12/1977 | Wallace | .................. | B03C 1/253 198/619 |
| 4,151,431 A | 4/1979 | Johnson | | |
| 4,215,330 A * | 7/1980 | Hartman | ................. | H02K 53/00 310/12.04 |
| 5,441,434 A * | 8/1995 | Caulkins | ................ | B65G 54/02 104/154 |
| 7,610,861 B1 * | 11/2009 | Colclasure | .............. | B60L 13/00 104/290 |
| 8,616,134 B2 * | 12/2013 | King | ....................... | B60L 13/03 104/284 |
| 9,969,556 B2 * | 5/2018 | Andersen | ............. | B65G 17/083 |
| 2020/0204090 A1 * | 6/2020 | Dabney | .................. | H02N 11/00 |

OTHER PUBLICATIONS

"Simple Magnetic Overunity Toy" Aug. 20, 2020, Wikipedia (Year: 2020).*
Koutny et al. Completion and operational testing of the Adams' permanent magnet electric D.C. motor-generator. 2015 16th International Scientific Conference on Electric Power Engineering (EPE), May 2015, pp. 560-565.
Wikipedia. Magnet Motor. Online encyclopedia, originally downloaded Jul. 23, 2021, 3 pages.

* cited by examiner

*Primary Examiner* — Mark A Deuble
(74) *Attorney, Agent, or Firm* — Craig R. Miles; CR Miles P.C.

(57) ABSTRACT

A magnetic energy system including a pathway having inclined portions of the pathway contiguous with declined portions of the pathway and an object adapted to move on the pathway by descending a declined portion of the pathway under the influence of gravity and ascending the contiguous inclined portion of the pathway under the combined influence of kinetic energy and a magnetic flux field interaction with release of the object from the magnetic flux field interaction at a pathway height equal to or greater than the initial height of the object on the preceding declined portion of the pathway.

14 Claims, 15 Drawing Sheets

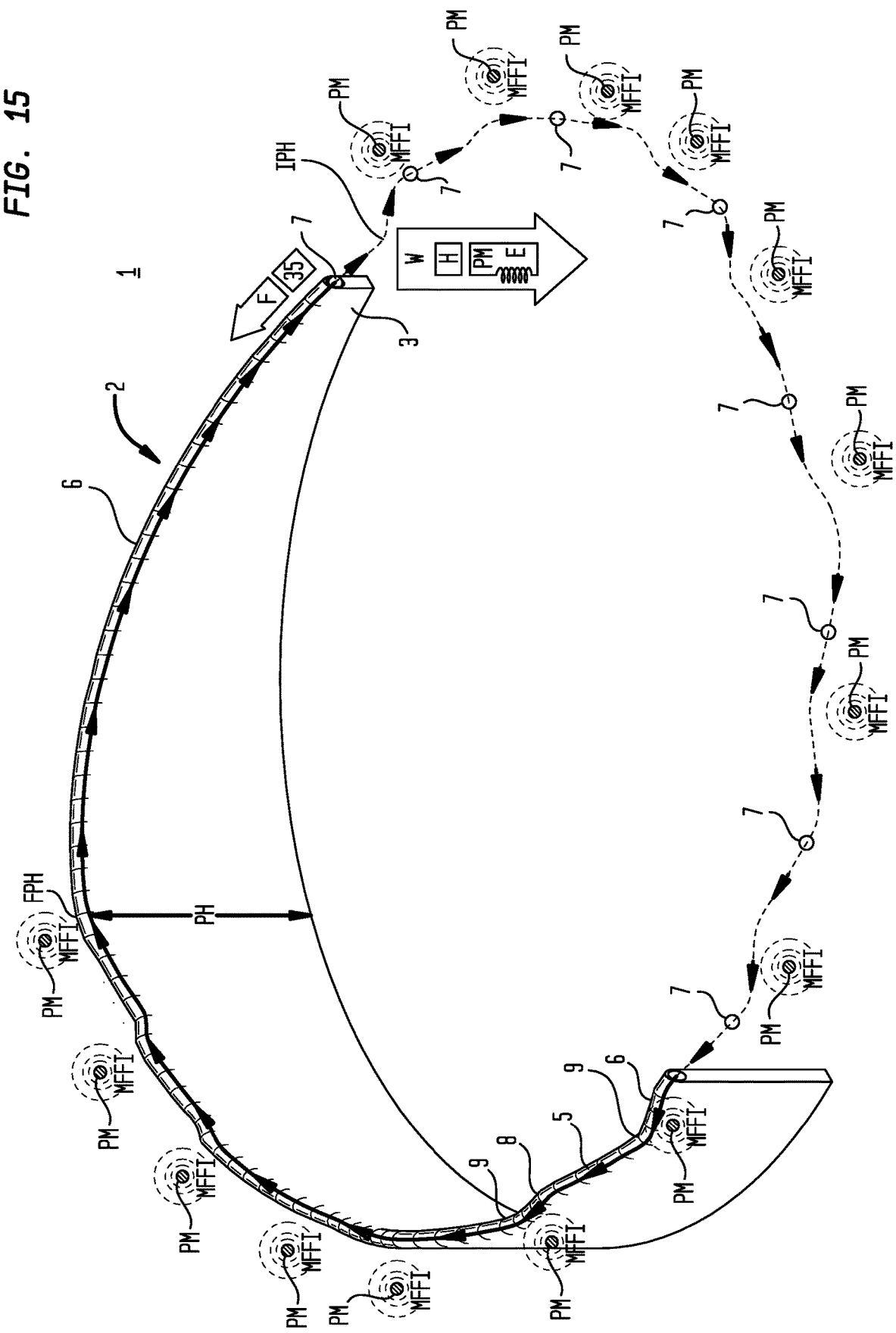

MAGNETIC ENERGY SYSTEM

I. FIELD OF THE INVENTION

A magnetic energy system including a pathway having inclined portions of the pathway contiguous with declined portions of the pathway and an object adapted to move on the pathway by descending a declined portion of the pathway under the influence of gravity and ascending the contiguous inclined portion of the pathway under the combined influence of kinetic energy and a magnetic flux field interaction with release of the object from the magnetic flux field interaction at a pathway height equal to or greater than the initial height of the object on the preceding declined portion of the pathway.

II. SUMMARY OF THE INVENTION

A broad object of embodiments of the invention can be to provide an apparatus including an object that moves on a pathway having an inclined portion contiguous with a declined portion and generates a magnetic flux field interaction with the object along a portion of said pathway to overcome force of gravity associated with the object moving on the inclined portion of the support and releases the magnetic flux interaction to allow movement of the object on the declined portion of the support under influence of force of gravity.

Another broad object of embodiments of the invention can be to provide a method of making an apparatus including obtaining a support having a pathway including an inclined portion contiguous with a declined portion and adapting an object to move along the pathway of said support, and generating a magnetic flux field interaction with the object along a portion of the pathway, whereby the object overcomes force of gravity associated with movement on the inclined portion of the support by interaction with said magnetic flux field along, and released from the magnetic flux field interaction moves on the declined portion of said support under influence of gravity.

Another broad object of embodiments of the invention can be to provide a method of using an apparatus including releasing an object on a pathway including an inclined portion contiguous with a declined portion, wherein the apparatus generates a magnetic flux field interaction with the object along a portion of the pathway, whereby the object overcomes force of gravity associated with movement on the inclined portion of the support by interaction with said magnetic flux field along, and released from the magnetic flux field interaction moves on the declined portion of said support under influence of gravity.

Naturally, further objects of the invention are disclosed throughout other areas of the specification, drawings, photographs, and claims.

III. BRIEF DESCRIPTION OF THE DRAWINGS

Figure 14:
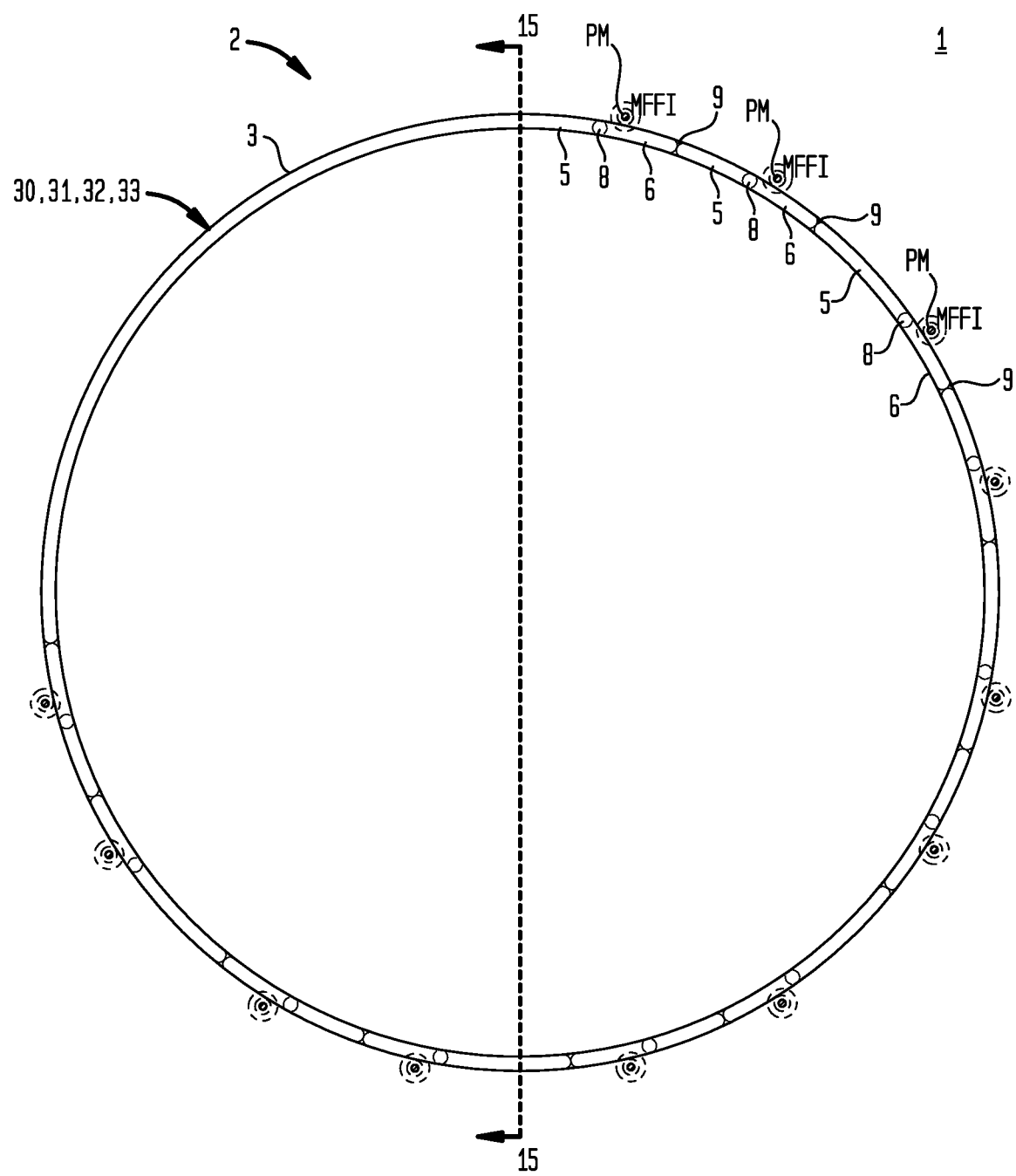

FIG. 14 is top plan view of a circuitous pathway which joins a pathway starting point to a pathway ending point in which the trough height and the apex height increase from an initial pathway height to a final pathway height in a first portion of the circuitous pathway over which an object ascends and a declined portion over which an object descends from the final pathway height to the initial pathway height in a second portion of the circuitous pathway.

FIG. 15 is a cross section 15-15 shown in FIG. 14 of a portion of the circuitous pathway.

IV. DETAILED DESCRIPTION OF THE INVENTION

Now, with reference to FIGS. 1 through 15, which illustrate various embodiments of a magnetic energy system (1) including embodiments of a magnetic energy apparatus (2) and methods of making and using various embodiments of the magnetic energy apparatus (2). Embodiments of the magnetic energy system (1) can comprise a support (3) including a pathway (4) having an inclined portion (5) contiguous with a declined portion (6) to afford a continuous pathway (4). An object (7) can be adapted to or configured to move along the pathway (4) of the support (3) (shown in solid line at initial position (IP) and in broken line showing movement of the object (7)). The object (7) at an initial position (IP) on a declined portion (6) of the pathway (4) has potential energy (PE) of movement down the declined portion (6) of the pathway (4) under influence of gravity (G). As the object (7) moves under influence of gravity (G) in the declined portion (6) of the pathway (4) the potential energy (PE) of the object (7) decreases and the kinetic energy (KE) of the object (7) increases. As the object (7) moves on the adjacent inclined portion (5) of the pathway (4), the object (7) converts kinetic energy (KE) to potential energy (PE).

The sum of the potential energy (PE) and kinetic energy (KE) for the object (7) remains constant in the absence of outside forces (OF). Accordingly, in the absence of outside forces (OF), the object (7) will ascend the inclined portion (5) of the pathway (4) to the same height from which it descended in the declined portion (6) of the pathway (4). In the magnetic energy system (1), the object (7) moving in the pathway (4) encounters one or more outside forces (OF): frictional force (FF), applied force (AF), gravity (G) and air resistance (AR). Even in the event outside forces (OF) are minimized, they cannot be reduced to zero. Thus, the object (7) having descended from its initial position (IP) on the declined portion (6) of the pathway (4) will not achieve the same height on the adjacent inclined portion (5) of the pathway (4) from which it descended in the declined portion (6) of the pathway (4) without a balancing force (BF).

Figure 1:
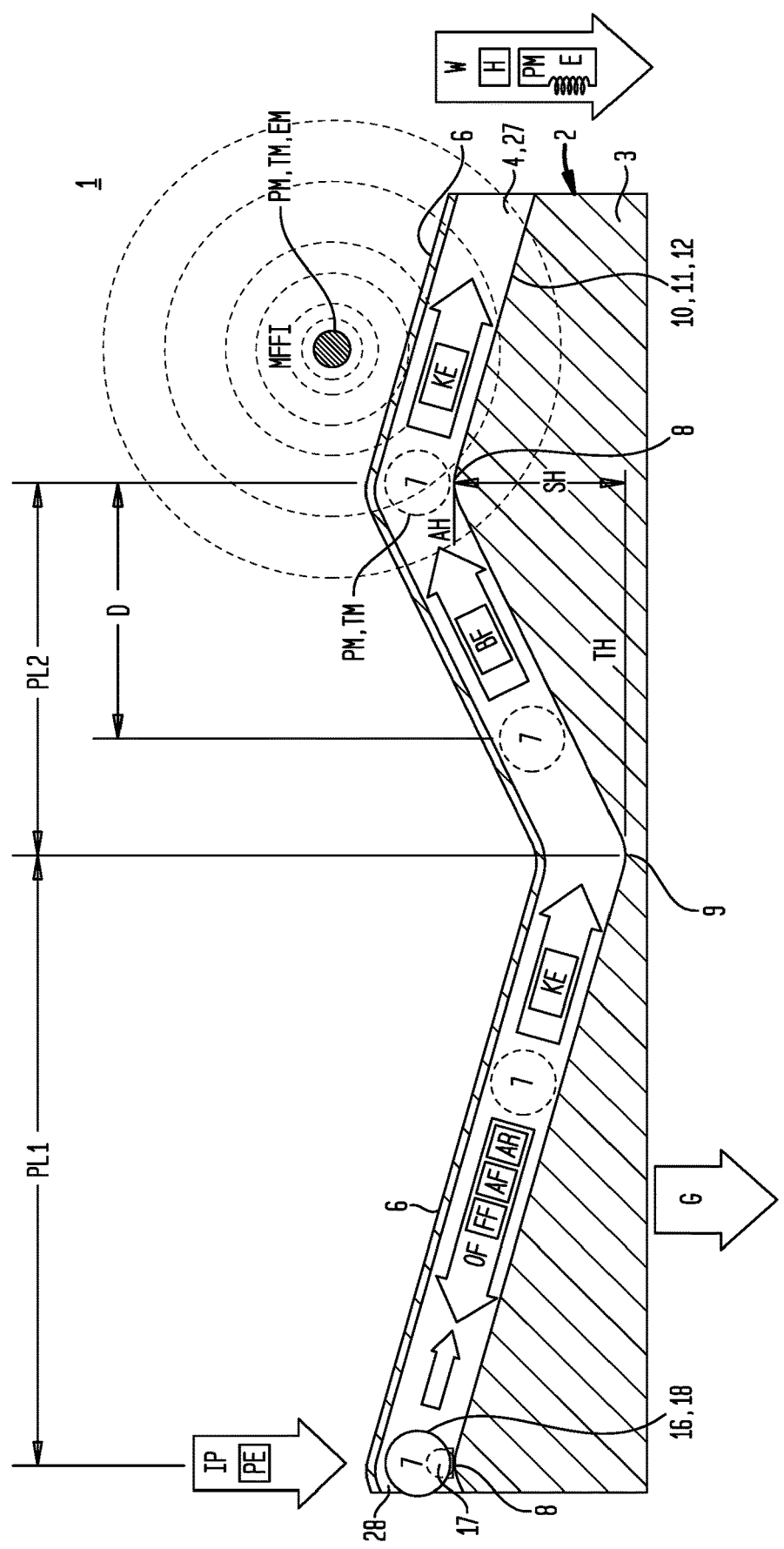
FIG. 1 is cross sectional view which illustrates methods of making and using a particular embodiment of the magnetic energy system.

Now, with primary reference to FIG. 1, the balancing force (BF) can include a magnetic flux field interaction (MFFI) with the object (7) along a portion of the pathway (4). The object (7) in association with the magnetic flux field interaction (MFFI) can overcome the outside forces (OF) to achieve the same height or a greater height on the adjacent inclined portion (5) of the pathway (4) from which it descended in the declined portion (6) of the pathway (4). In particular embodiments, the magnetic flux field interaction (MFFI) between said object (7) along the portion of said pathway (4) combined with the kinetic energy (KE) of the object (7) can be sufficient to overcome the force of gravity (G) and the other outside forces (OF) associated with the object (7) moving on the inclined portion (5) of the pathway (4) allowing the object (7) to move to an apex (8) of the inclined portion (5) of the pathway (4). As further described below, the magnetic flux field interaction (MFFI) can be generated in several ways including: a permanent magnet (PM) associated with a portion of the pathway (4) and with the object (7) acting as a temporary magnet (TM) moving along the portion of the pathway (4); a permanent magnet (PM) associated with the object (7) moving along the pathway (4) and a portion of the pathway (4) acting as a temporary magnet (TM); or a permanent magnet (PM) associated with a portion of the pathway (4) and a permanent magnet associated with the with the object (7) moving along the portion of the pathway (4). The term "permanent magnetic" for the purposes of this invention comprises a magnetized material or electric current that creates a persistent magnetic field. The term "temporary magnet" for the purposes of this invention comprises a material that only retains magnetism while near a permanent magnetic field or electronic current. The material can be magnetized in the presence of a magnetic field and loses magnetism gradually upon removal of the magnetic field. In particular embodiments, the potential energy (KE) of the object at the apex (8) of the pathway (4) combined with the force of gravity (G) can be sufficient to overcome the magnetic flux field interaction (MFFI) between the object (7) at the apex (8) of the inclined portion (5) of the pathway (4) allowing the object (7) to move away from the apex (8) and down the declined portion (6) of the pathway (4).

Now, with primary reference to FIGS. 2 through 7, in particular embodiments the pathway (4) can include a plurality of inclined portions (5) of the pathway (4) and a plurality of declined portions (6) of the pathway (4), wherein each one of the plurality of inclined portions (5) joins a corresponding one of the plurality of declined portions (6) of the pathway (4) at an apex (8) of the pathway (4), and wherein each one of the plurality of declined portions (6) of the pathway (4) joins a corresponding one of the plurality of inclined portions (5) of the pathway at a trough (9) disposed between a pair of apexes (8) of the pathway (4). The pathway (4) can have a pathway step height (SH) determined by an apex height (AH) less the preceding adjacent trough height (TH). The pathway (4) having a pathway height (PH) defined by the greatest apex height (AH) in the pathway (4) less the least trough height (TH) in the pathway (4).

Now, with primary reference to FIGS. 1 through 4, in particular embodiments, the pathway (4) can have a plurality of troughs (9) having substantially the same trough height (TH) and can have a plurality of apexes (8) having substantially the same said apex height (AH). Thus, each of the pathway step heights (SH) in the pathway (4) remain substantially the same.

Figure 5:
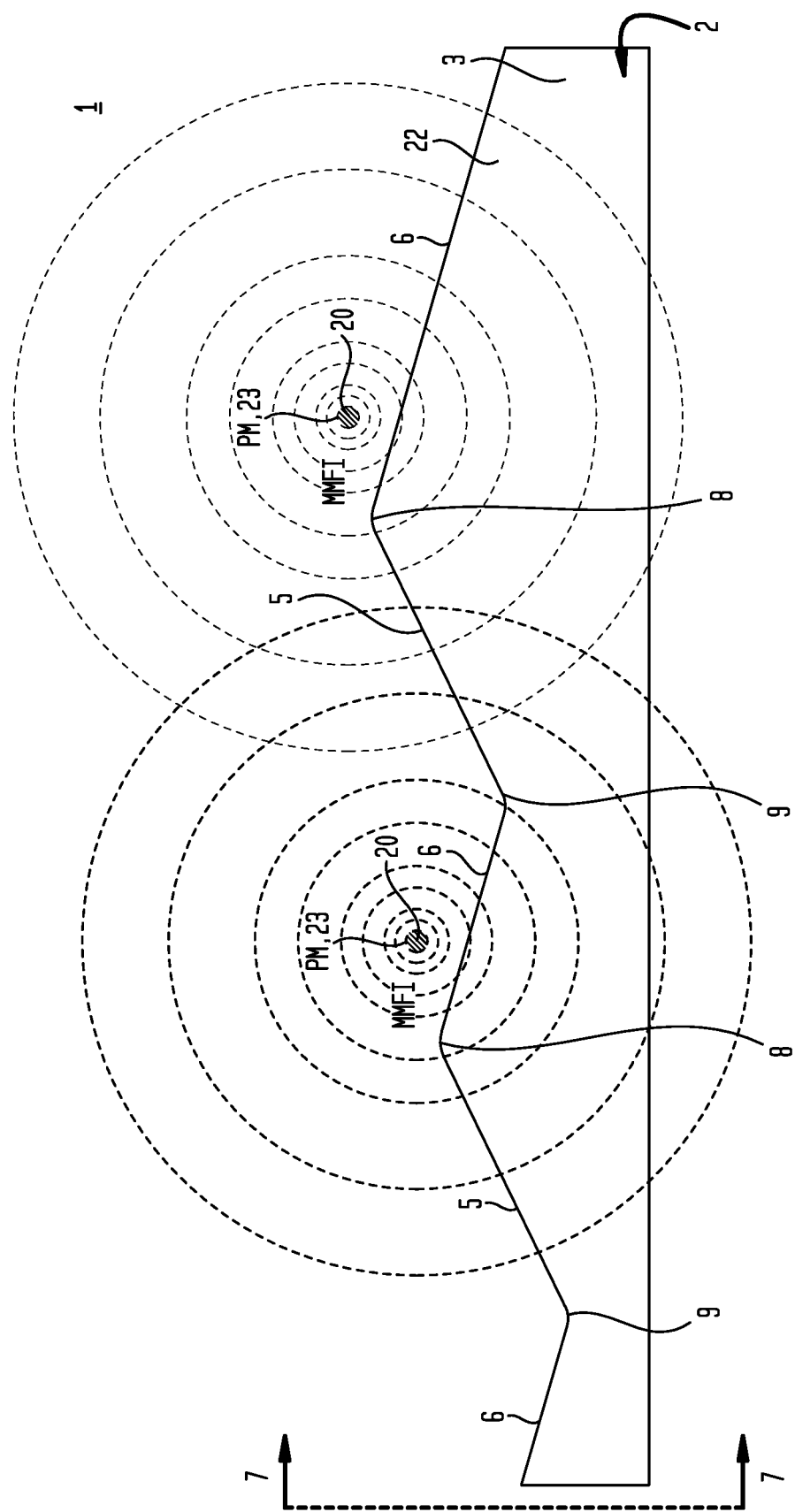
FIG. 5 is a first side elevation view of a particular embodiment of the magnetic energy system in which the pathway step height increases between a pathway starting point and a pathway ending point.
Figure 6:
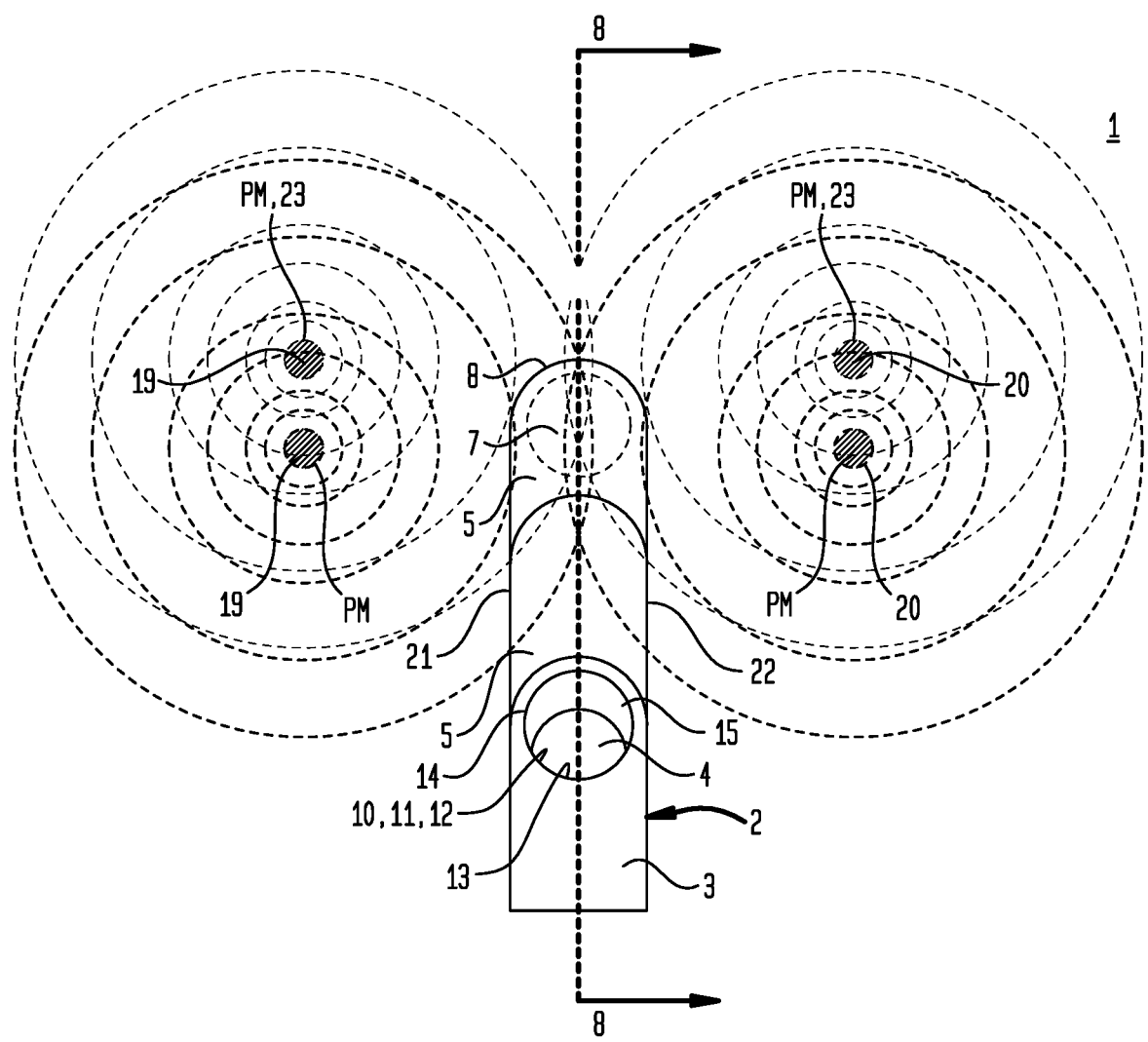
FIG. 6 is first end elevation view 6-6 of the particular embodiment of the magnetic energy system shown in FIG. 5.
Figure 7:
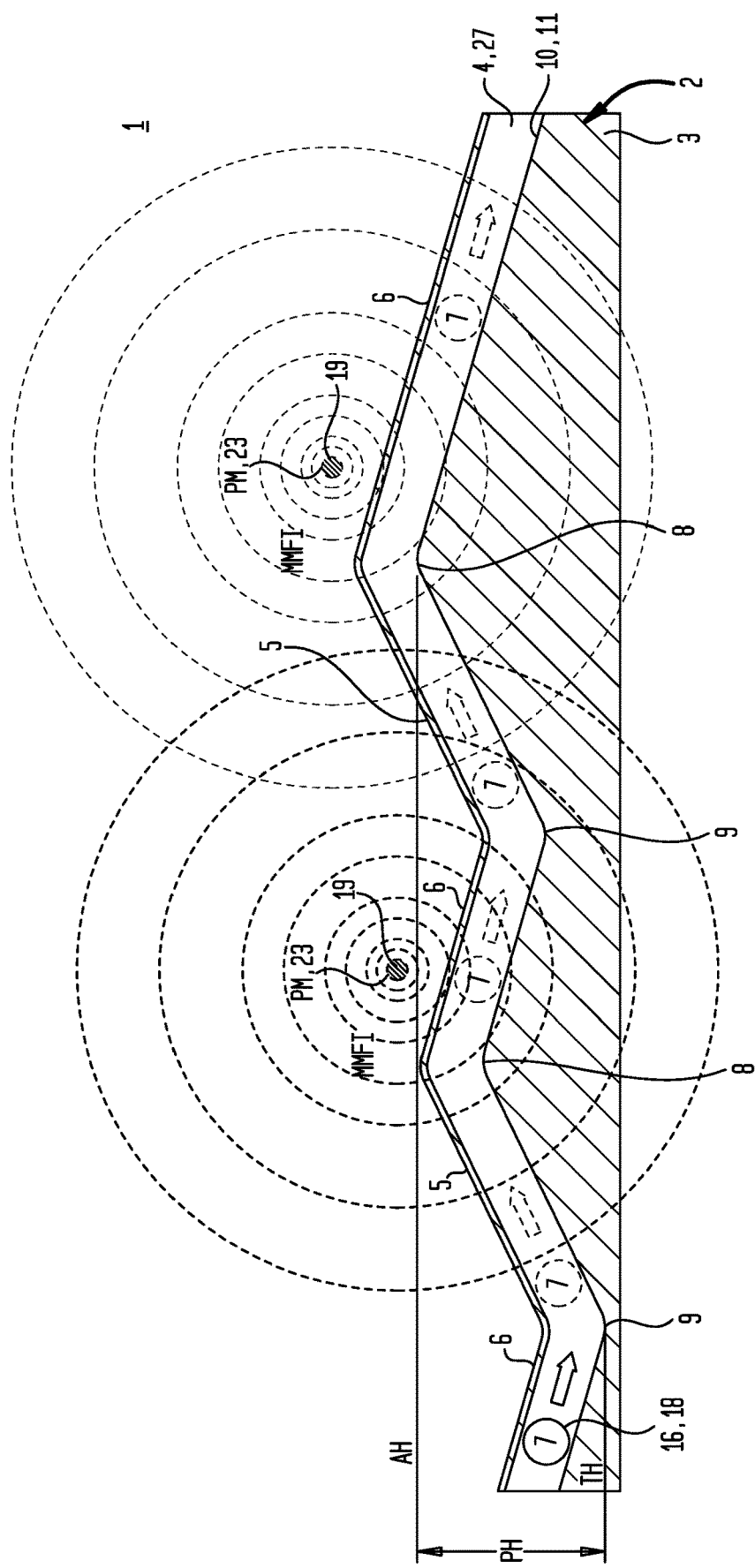
FIG. 7 is a cross section view 7-7 of the particular embodiment of the magnetic energy system shown in FIG. 6.

Now, with primary reference to FIGS. 5 through 7, in particular embodiments, the pathway (4) can have a plurality of apexes (8) and a plurality of troughs (9), wherein the trough height (TH) and the apex height (AH) increase over the pathway (4). In certain instances, each of the plurality of pathway step heights (SH) along the pathway (4) can remain substantially the same, while in certain instances, plurality of pathway step heights (SH) along the pathway may be different. As shown in the illustrative example of FIG. 5, the trough height (TH) and the apex height (AH) increase over the pathway (4) while each of the plurality of pathway step heights (SH) along the pathway (4) remain substantially the same; however, this is not intended to preclude embodiments wherein a plurality of step heights (SH) vary within a pathway (4). Also, as shown in the illustrative example of FIG. 5, the overall pathway height (PH) increases over a plurality of step heights (SH) in the pathway (4).

Figure 2:
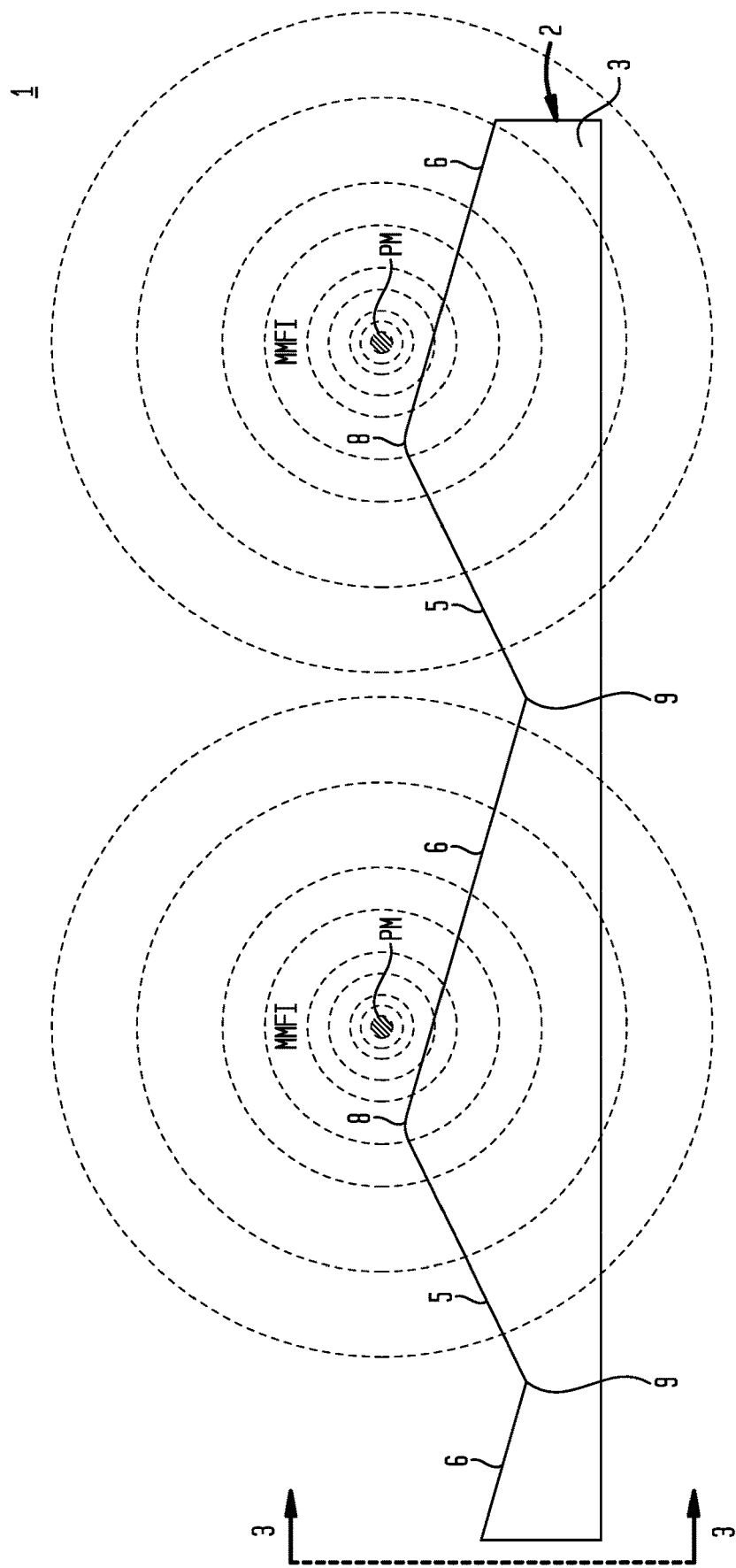
FIG. 2 is a first side elevation view of a particular embodiment of a magnetic energy system.

Now, with primary reference to FIGS. 2 and 5, in particular embodiments, the inclined portion (5) of the pathway (4) from a trough (9) to the apex (8) can have substantially the same pathway length (PL) as the declined portion (6) of the pathway (4) succeeding the apex (8) to corresponding trough (9); however, this is not intended to preclude embodiments in which the inclined portion (5) of the pathway (4) from a trough (9) to the apex (8) has a greater pathway length (PL1) than the declined portion (6) succeeding the apex (8) to the corresponding trough (9) or where the inclined portion (5) of the pathway (4) from a trough (9) to the apex (8) has a lesser pathway length (PL2) than the declined portion (6) succeeding the apex (8) to the corresponding trough (9) (as shown in the illustrative example of FIG. 1).

Again, with primary reference to FIGS. 1 through 7, in particular embodiments, the pathway (4) can include a pathway surface (10) configured to guide movement of the object (7) on the pathway (4). As shown in the illustrative example of FIGS. 2 through 7, in certain instances, the pathway surface (10) of said pathway (4) can be configured as a tubular structure (11) to guide movement of the object (7). However, this illustrative example of a tubular structure (11) is not intended to preclude other embodiments of the pathway (4) having a different structure which allows the object (7) to move along the pathway (4), as above described. A further example affords a pathway surface (10) configured as a channel (12) having a channel base (13) disposed between a pair of channel sidewalls (14)(15) in which the object (7) moves along the pathway (4).

Again, with primary reference to FIGS. 1 through 7, in particular embodiments, the object (7) can include an object body (16) supported for translational motion over the pathway surface (10) of the support (3) with a reduction in outside forces (OF). In certain instances, the object (7) can include one or more roller elements (17) configured to roll on the pathway (4) of the support (3). As one illustrative example, the object body (16) can be supported for translational motion over the pathway surface (10) by one or more roller bearings or wheels. Now, with primary reference to the example of FIG. 4, the object (7) can be configured as a cylinder or sphere (18) which rolls on the pathway (4) of the support (3). However, these illustrative examples are not intended to preclude other structural embodiments of the object adapted or configured to move along the pathway under the influence of gravity (G) and the magnetic flux field interaction (MFFI).

Now, with primary reference to FIGS. 2 through 7, in particular embodiments, the magnetic flux field interaction (MFFI) can be generated between a permanent magnet (PM) associated with a portion of the pathway (4) and with the object (7) acting as a temporary magnet (TM) moving along the portion of the pathway (4). The permanent magnet (PM) can be adjusted in spatial relation to the pathway (4) of the support (3) to achieve the magnetic flux field interaction (MFFI) between the permanent magnet (PM) with the object (7) acting as a temporary magnet (TM) in the portion of the pathway (4) to afford the balancing force (BF) necessary to overcome gravity (G) combined with outside forces (OF) to draw the object to the apex (8) of the pathway (4) and to further overcome the magnetic field flux interaction (MFFI) between the permanent magnet (PM) and the object acting as a temporary magnet (TM) by the influence of gravity (G) acting on the object (7) to move the object (7) down the declined portion (6) of the pathway (3).

Figure 3:
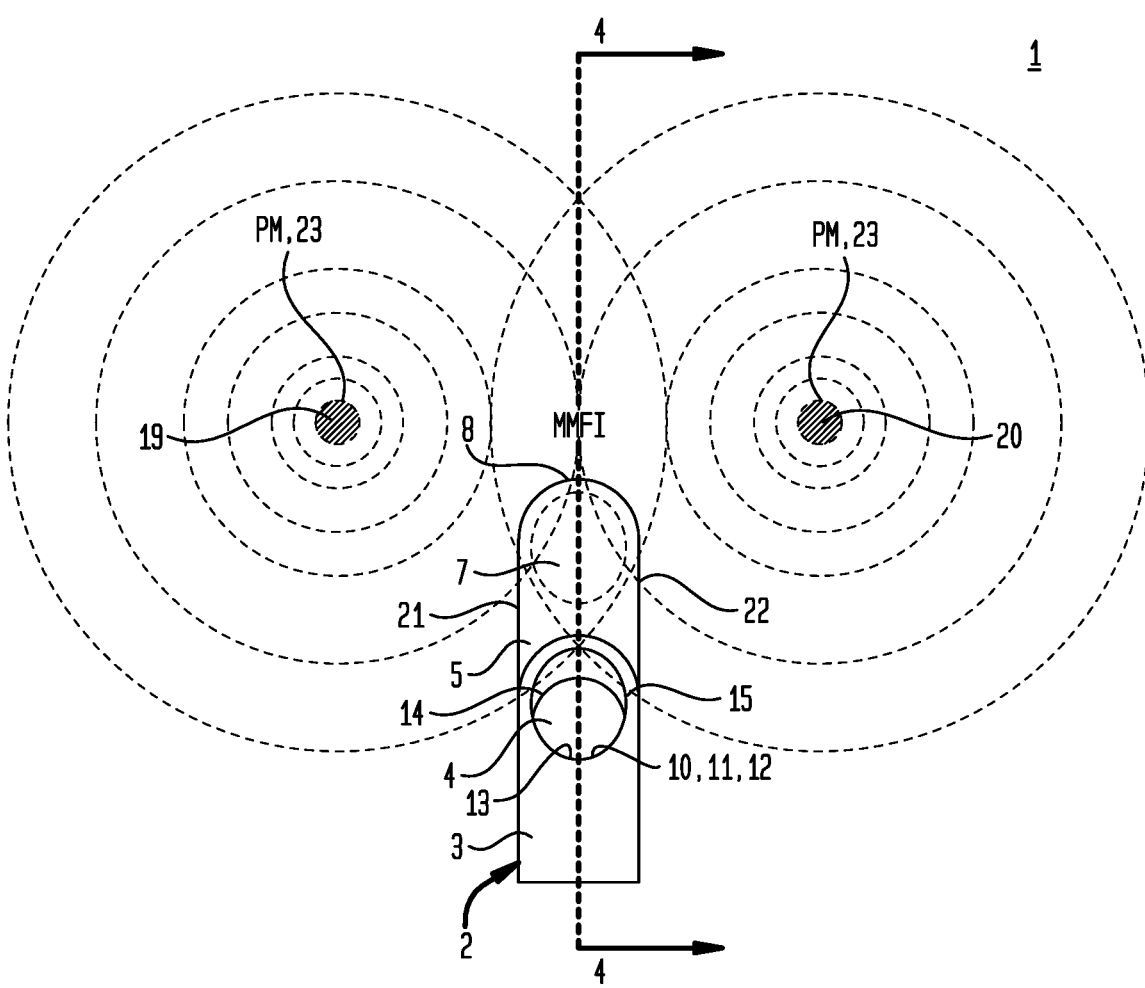
FIG. 3 is first end elevation view 3-3 of the particular embodiment of the magnetic energy system shown in FIG. 2.
Figure 4:
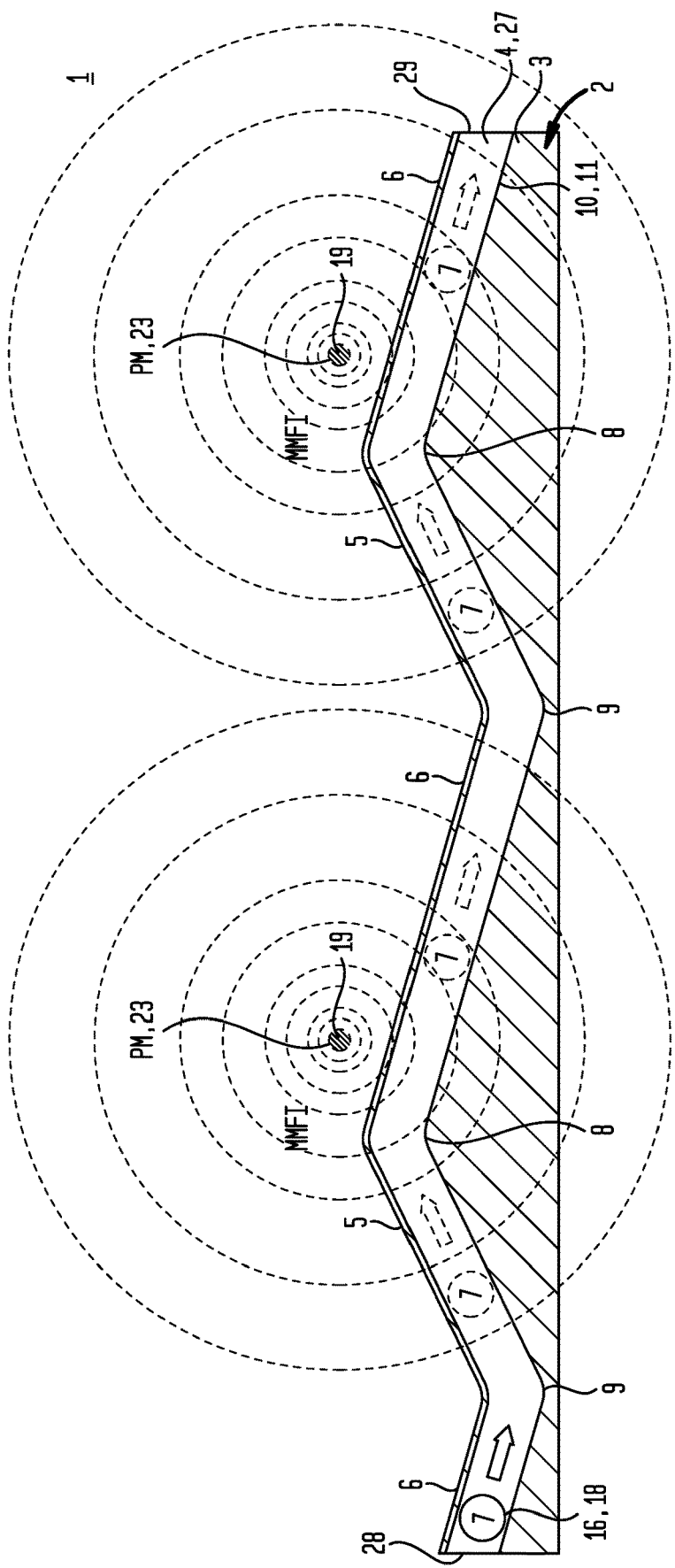
FIG. 4 is a cross section view 4-4 of the particular embodiment of the magnetic energy system shown in FIG. 3.

Now, with primary reference to FIG. 3, a magnetic flux field interaction (MFFI) suitable for use with particular embodiments can be achieved by disposing a first of a pair magnetic poles (19) of a permanent magnet (PM) adjacent a pathway first side (21) and disposing a second of a pair of magnetic poles (20) of a permanent magnet (PM) adjacent a pathway second side (22) of the portion of the pathway (4) associated with the magnetic flux field interaction (MFFI). In the example of FIG. 3, the permanent magnet (PM) can comprise a horseshoe magnet (PM,23). However, a suitable magnetic flux field interaction (MFFI) between a permanent magnet (PM) with the object (7) acting as a temporary magnet (TM) can be achieved using numerous and varied magnet structures comprising, or consisting of, one more of: a bar magnet, a horseshoe magnet, a disc magnet, a sphere magnet, a cylinder magnet, a ring magnet, and combinations thereof.

Figure 8:
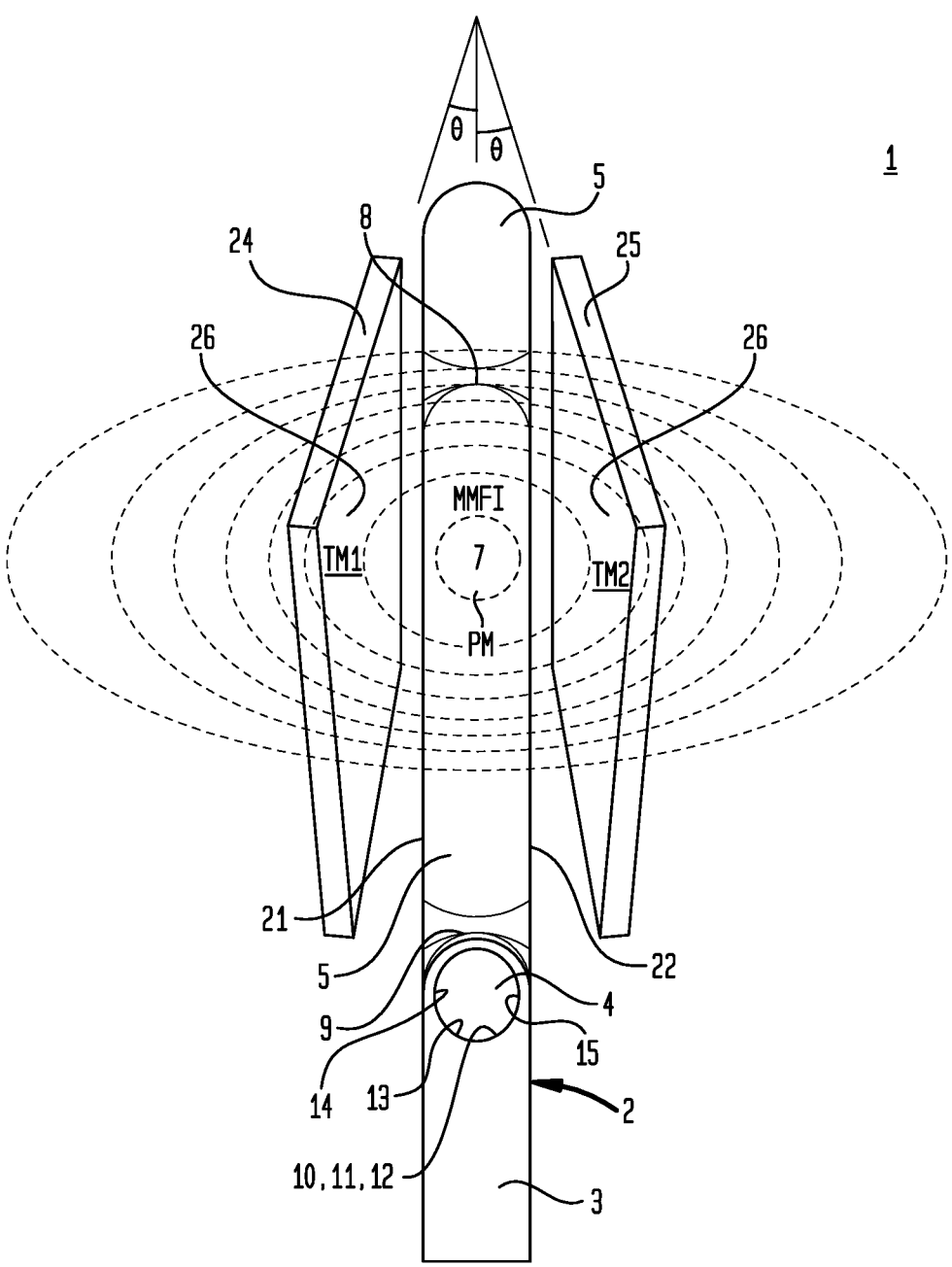
FIG. 8 is first end elevation view of a particular embodiment of the magnetic energy system in which a magnetic flux field interaction is generated between an object associated with a permanent magnet moves on a pathway and a portion of the pathway associated with a temporary magnet.
Figure 9:
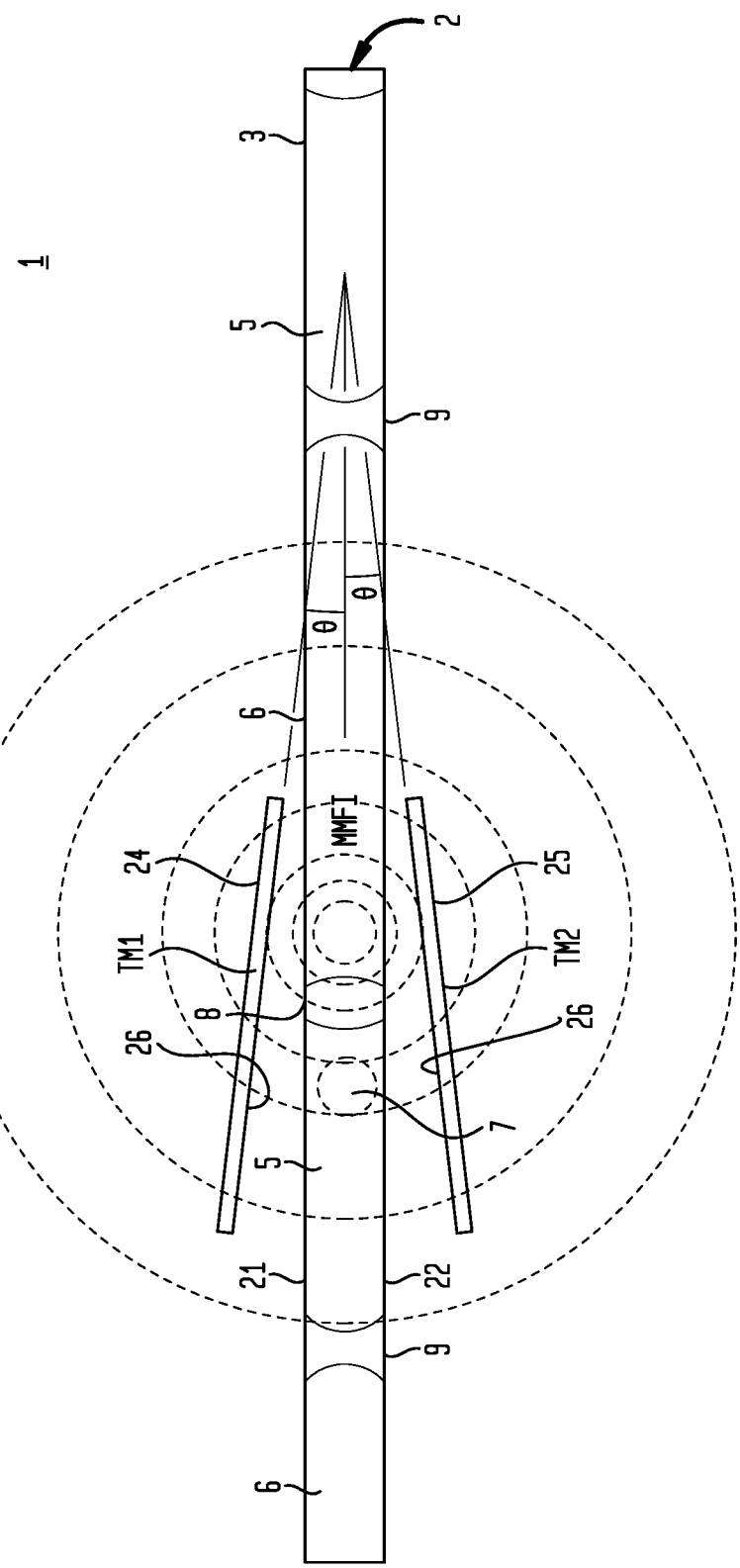
FIG. 9 is a top plan view of the particular embodiment of the magnetic energy system shown in FIG. 8.
Figure 10:
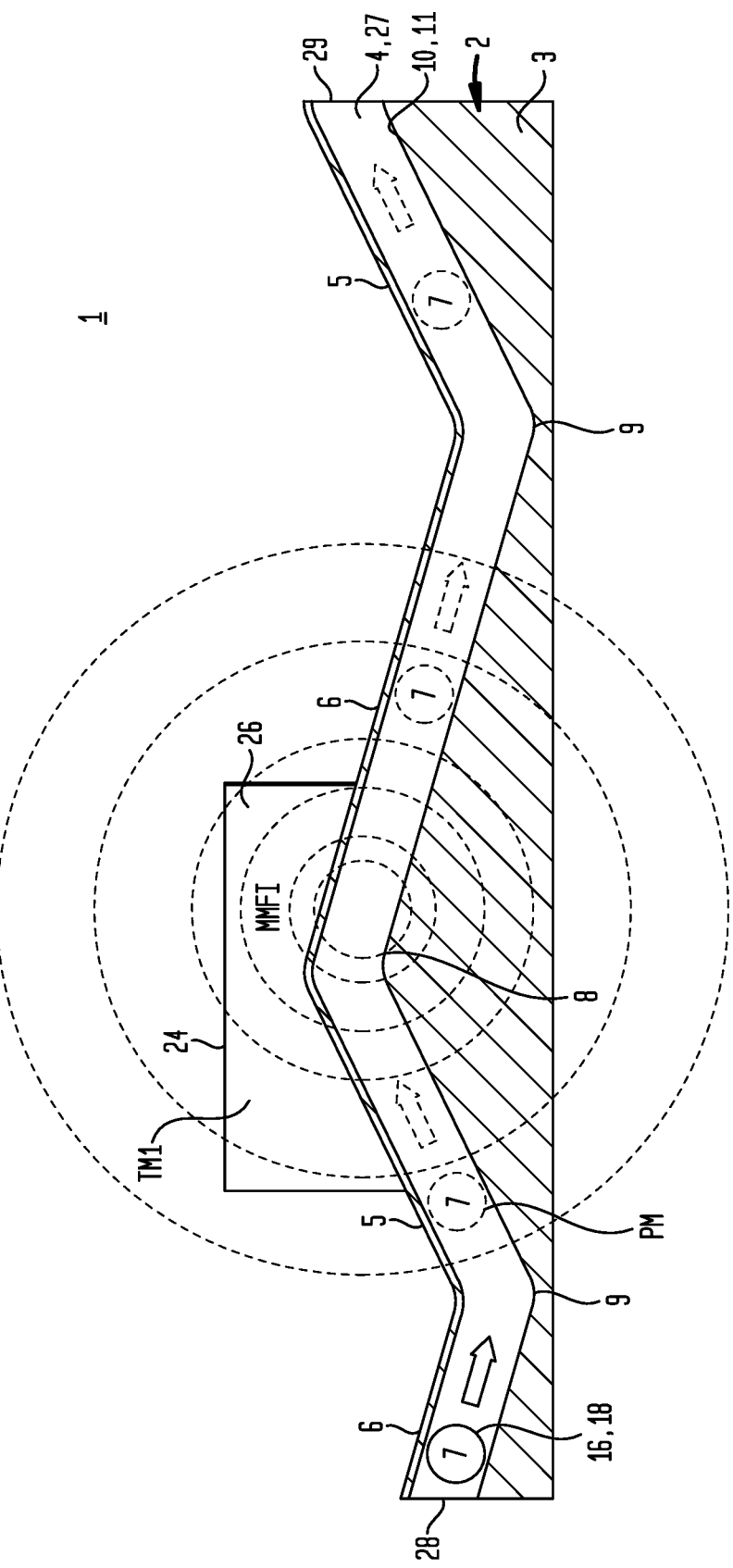
FIG. 10 is a cross section elevation view 10-10 of the particular embodiment of the magnetic energy system shown in FIG. 8.

Now, with primary reference to FIGS. 8 through 10, in particular embodiments, the magnetic flux field interaction (MFFI) can be generated between a permanent magnet (PM) associated with or being the object (7) moving along the portion of the pathway (4) and a temporary magnet (TM) associated with or integrated in the portion of the pathway (4). The temporary magnet (TM) in spatial relation to the object (7) can be adjusted in spatial relation to the pathway (4) to achieve the magnetic flux field interaction (MFFI) between the object (7) acting as a permanent magnet (PM) in the portion of the pathway (4) acting as the temporary magnet (TM) to afford the balancing force (BF) necessary to overcome gravity (G) combined with outside forces (OF) to draw the object (7) to the apex (8) of the pathway (4) and to further overcome the magnetic field flux interaction (MFFI) between the object (7) acting as the permanent magnet (PM) and the portion of the pathway (4) acting as a temporary magnet (TM) by the influence of gravity (G) acting on the object (7) to move the object (7) down the declined portion (6) of the pathway (4).

Again, with primary reference to FIGS. 8 through 10, the object (7) acting as the permanent magnet (PM) can comprise a sphere (18) moving along the pathway (4). The portion of the pathway (4) acting as the temporary magnet (TM) can be adapted to or configured to increase the magnetic flux field interaction (MFFI) with the object (7) as the object approaches the apex (8) of an inclined portion (5) of the pathway (4). That is, as a distance (D) between the object (7) and the apex (8) of an inclined portion (5) decreases the strength of the magnetic flux interaction (MFFI) between the object (7) acting as the permanent magnet (PM) and the portion of the pathway (4) acting as the temporary magnet (TM) increases. One way to achieve an increasing strength of the magnetic flux interaction (MFFI) between the permanent magnet (PM) and the temporary magnet (TM) can be to reduce the distance between the permanent magnet (PM) and the temporary magnet (TM) approaching the apex (8) of the inclined portion (5) of the pathway (4).

Now, with reference to the illustrative example of FIGS. 8 through 10, an embodiment configured to reduce the distance (D) between the permanent magnet (PM) and the temporary magnet (TM) approaching the apex (8) of the inclined portion (5) of the pathway (4) can include first and second temporary magnetics (TM1, TM2) correspondingly disposed adjacent pathway first and second sides (21)(22) along the portion of the pathway (4). The first and second temporary magnets (TM1, TM2) can be disposed in angled (θ) spatial relation to the portion of the pathway (4) such that the distance (D) between the first and second temporary magnets (TM1, TM2) decreases approaching the apex (8) of the inclined portion (5) of the pathway (4). Thus, as the object (7) acting as the permanent magnet (PM) moves on the pathway (4) between the first and second temporary magnets (TM1, TM2) approaching the apex (8) of the inclined portion (5) of the pathway (4), the magnetic flux field interaction (MFFI) increases approaching the apex (8) of the inclined portion (5) sufficient to overcome gravity (G) and outside forces (OF) to move the object (7) to the apex (8) of the inclined portion (5) of the pathway (4). The first and second temporary magnets (TM1, TM2) can be disposed in angled (θ) spatial relation to the portion of the pathway (4) to allow gravity (G) acting on the object (7) to allow movement of the object (7) down the declined portion (6) of the pathway (4). The illustrative embodiment of FIGS. 8 through 10, includes first and second plates (24)(25) each having a substantially planar or planar surface (26) that can be disposed in angled (θ) spatial relation to the portion of the pathway (4) such that the distance (D) between the planar surfaces (26) decreases approaching the apex (8) of the inclined portion (5) of the pathway (4). In particular embodiments, the temporary magnet (TM) can be configured as one temporary magnet (TM) disposed in angled (θ) spatial relation to the inclined portion (5) of the pathway (4) such that the distance (D) between the temporary magnet (TM) and the object (7) acting as the permanent magnet (PM) decreases approaching the apex (8) of the pathway (4). In particular embodiments, the support (3) and the temporary magnet(s) (TM1, TM2) can be integrated as one unit.

The illustrative examples of FIGS. 2 through 7 and FIGS. 8 through 10, which include a permanent magnet (PM) and a temporary magnet (TM) are not intended to preclude embodiments in which the object (7) comprises or consists of a first permanent magnet (PM1) which moves along the pathway (4) and in which a second permanent magnet (PM2) can be disposed in spatial relation or angle (θ) spatial relation whether or not integrated with the support (3) to achieve the magnetic flux field interaction (MFFI) above described. Nor are the illustrative examples intended to preclude embodiments in which the object (7) comprises or consists of a first electromagnet (EM1) which moves along the pathway (4) and in which a second electromagnet (EM2) can be disposed in spatial relation or angled (θ) spatial relation whether or not integrated with the support (3) to achieve the magnetic flux field interaction (MFFI) above described.

Figure 11:
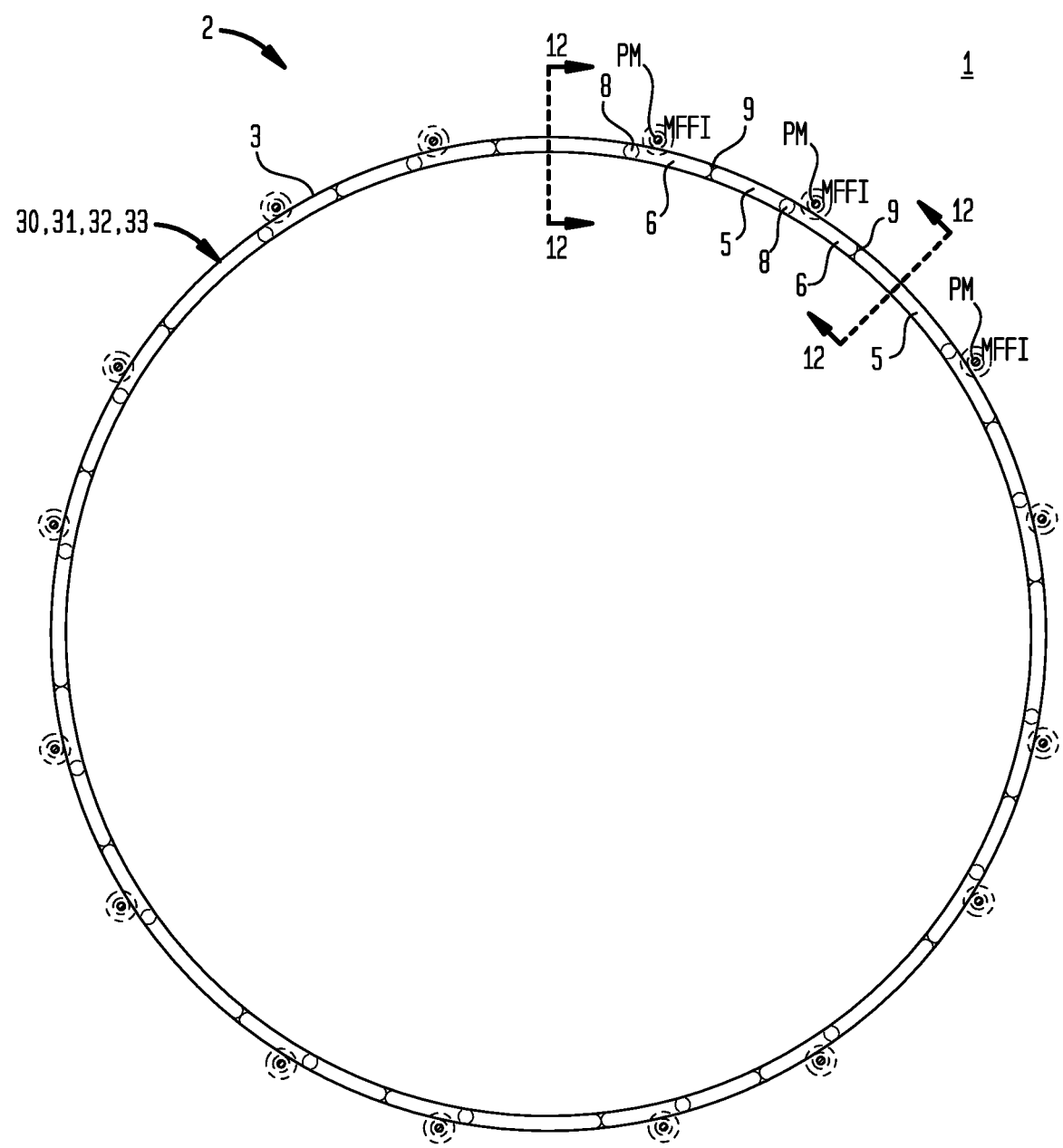
FIG. 11 is a top plan view of a particular embodiment of the magnetic energy system having a circuitous pathway in which joins a pathway starting point to a pathway ending point.
Figure 12:
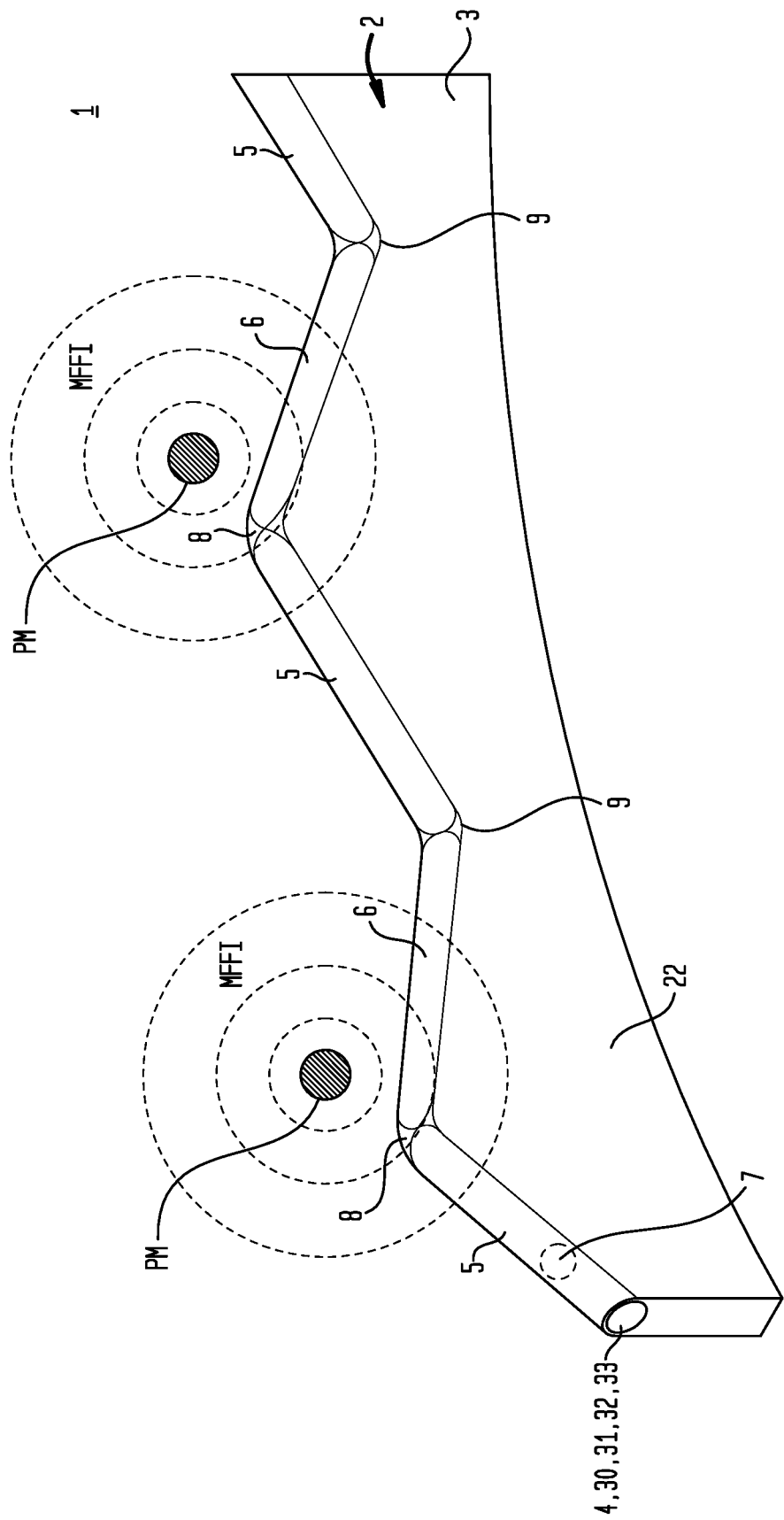
FIG. 12 is a segment of the circuitous pathway 12-12 of the particular embodiment of the magnetic energy system shown in FIG. 11.
Figure 13:
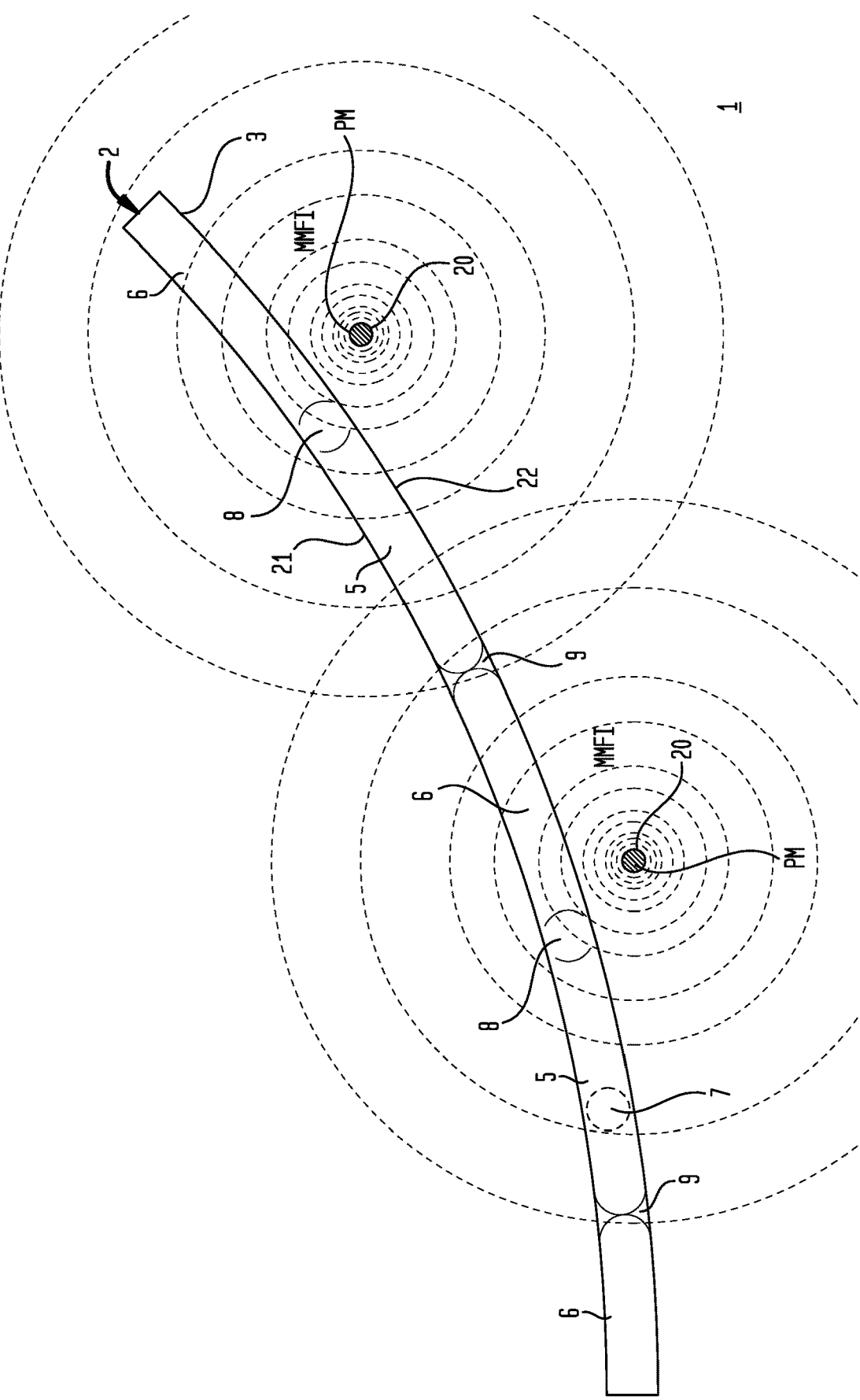
FIG. 13 is a top plan view of the segment of the circuitous pathway show in FIG. 12.

Again, with primary reference to FIGS. 2 through 10 the pathway (4) of the support (3) can comprise or consist of a substantially linear or linear pathway (27) disposed between opposite open pathway starting and ending points (28)(29), while in other embodiments as shown in FIGS. 11 through 13, the pathway (4) of the support (3) can include a non-linear pathway (30). As shown in the example of FIGS. 12 and 13, the support (3) or the pathway (4) of the support can be an arcuate pathway (31) which may include a circular curve (a segment of a circle) or may include a sigmoidal curve, or combinations thereof, each can be disposed between opposite open pathway starting and ending points (28)(29).

Now, with primary reference to the example shown in FIGS. 11 through 13, in particular embodiments, the pathway (4) can, but need not necessarily, comprise a circuitous pathway (32) which joins a pathway starting point (28) to a pathway ending point (29). The circuitous pathway (32) can, but need not necessarily, be a substantially circular or circular pathway (33).

Now, with primary reference to FIGS. 14 and 15, in particular embodiments, the support (3) can be adapted to or configured to provide a circuitous pathway (32) which joins a pathway starting point (28) to a pathway ending point (29). A first portion of the circuitous pathway (32) can have a plurality of apexes (8) and a plurality of troughs (9), wherein the trough height (TH) and the apex height (AH) increase from initial pathway height (IPH) to a final pathway height (FPH) over the first portion of circuitous pathway (32). That is, the overall pathway height (PH) increases over a plurality of step heights (SH) in the first portion of the circuitous pathway (32). A second portion of the circuitous pathway (32) includes a declined portion (6) over which the object (7) descends from the final pathway height (FPH) to the initial pathway height (IPH). The object (7) at the final pathway height (FPH) has potential energy (PI) to do work (W), where work equals mass (m) in kilograms×acceleration due to gravity (9.8 m/s$^2$)(g)×height (h) in meters (mgh). Potential energy (PI) of the object (7) at the final pathway height (FPH) equals kinetic energy (KE) of the object (7) and work (W) performed during the descent of the object (7) to the initial pathway height (IPH). Work during the descent from the final pathway height (FPH) to the initial pathway height (IPH) can be any force (F) applied to the object (7) during the descent from the final pathway height (FPH) to the initial pathway height (IPH). Force (F) applied to the object (7) during the descent from the final pathway height (FPH) to the initial pathway height (IPH) can, as illustrative examples, where the object (7) comprises a permanent magnet (PM), generate electricity in coil of wire (34) or generate movement in a temporary magnet (TM); and as illustrative examples, where the object (7) comprises a temporary magnet (TM) can contact or move by contact a second object or material (35), or generate (H) due to friction.

As can be easily understood from the foregoing, the basic concepts of the present invention may be embodied in a variety of ways. The invention involves numerous and varied embodiments of a magnetic energy systems and methods for making and using such a magnetic energy system.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "support" should be understood to encompass disclosure of the act of "supporting"— whether explicitly discussed or not—and, conversely, were there is a disclosure of the act of "supporting", such a disclosure should be understood to encompass disclosure of a "support" and even a "means for supporting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the magnetic energy systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An apparatus, comprising:
   a support having a pathway including inclined portions contiguous with corresponding declined portions, each of said inclined portions of said pathway joins one said declined portions of said pathway at an apex of said pathway, each of said declined portions joins one of said inclined portions at a trough of said pathway, said pathway having a pathway step height determined by an apex height less the preceding adjacent trough height, said pathway having a plurality of apexes and a plurality of troughs, wherein said trough height and said apex height increases over said pathway;
   an object adapted to move along said pathway of said support; and
   a magnetic flux field interaction with said object along a portion of said pathway,
      said object overcoming outside forces associated with said object moving on said inclined portion of said pathway of said support by interaction with said magnetic flux field along said inclined portion of said pathway,
      said object accelerating due to force of gravity on said declined portion of said pathway.

2. The apparatus of claim 1, wherein said magnetic flux interaction between said object along said inclined portion of said pathway combined with said kinetic energy of said object is sufficient to overcome said outside forces associated with said object moving on said inclined portion of said pathway allowing said object to move toward said apex of said inclined portion of said pathway.

3. The apparatus of claim 2, wherein said kinetic energy of said object combined with said force of gravity is sufficient to overcome said magnetic flux interaction between said object at said apex of said inclined portion of said pathway allowing said object to move away from said apex on said declined portion of said pathway.

4. The apparatus of claim 2, wherein said magnetic flux field interaction is generated by a permanent magnet associated with a portion of said pathway along which said magnetic flux field interacts with said object, said object comprising a temporary magnet moving on said portion of said pathway along which said magnetic field interacts with said object.

5. The apparatus of claim 2, wherein said magnetic flux field interaction is generated by a permanent magnet associated with said object moving on said portion of said pathway along which said magnetic field interacts with said object, said portion of said pathway along which said magnetic field interacts with said object comprising a temporary magnet.

6. The apparatus of claim 5, wherein said temporary magnet is configured to increase said magnetic flux field interaction with a said object approaching said apex of said inclined portion of said pathway.

7. The apparatus of claim 6, wherein said temporary magnet is disposed at a distance from said permanent magnet associated with said moving object, said distance between said permanent magnet and said temporary magnet decreasing approaching said apex of said inclined portion of said pathway.

8. The apparatus of claim 1, wherein said object has an external surface configured to roll on said pathway of said support.

9. The apparatus of claim 1, wherein said inclined portion of said pathway having substantially the same length as said declined portion of said pathway.

10. The apparatus of claim 1, wherein said inclined portion of said pathway having greater length than said declined portion of said pathway.

11. The apparatus of claim 1, wherein said pathway has a pathway height defined by said apex of greatest said apex height less said trough of least said trough height.

12. The apparatus of claim 1, wherein each said pathway step height in said pathway remains substantially the same.

13. The apparatus of claim 1, wherein said pathway of said support comprises a substantially linear pathway or a non-linear pathway.

14. The apparatus of claim 1, wherein said pathway of said support comprises a circuitous pathway which joins a pathway starting point to a pathway ending point.

* * * * *